United States Patent [19]
Duffield

[11] 3,936,135

[45] Feb. 3, 1976

[54] CATCHING APPARATUS AND METHOD FOR JET DROP RECORDING

[75] Inventor: Peter L. Duffield, Kettering, Ohio

[73] Assignee: The Mead Corporation, Dayton, Ohio

[22] Filed: June 5, 1974

[21] Appl. No.: 476,384

Related U.S. Application Data

[63] Continuation-in-part of Ser. No. 277,999, Aug. 4, 1972, abandoned.

[52] U.S. Cl. .......................... 346/1; 118/50; 346/75; 346/140 R

[51] Int. Cl.² .......................................... G01D 15/18

[58] Field of Search ...... 346/75, 140; 118/624, 625, 118/628, 50

[56] References Cited

UNITED STATES PATENTS

| | | | |
|---|---|---|---|
| 2,676,868 | 4/1954 | Jacob | 346/75 |
| 3,596,275 | 7/1971 | Sweet | 346/75 X |
| 3,611,422 | 10/1971 | Rourke | 346/75 |
| 3,701,476 | 10/1972 | Houser | 346/75 X |

*Primary Examiner*—Joseph W. Hartary
*Attorney, Agent, or Firm*—Biebel, French & Bugg

[57] ABSTRACT

In a jet drop recording system a drop catcher includes a drop impinging face having a narrow slot at its lower edge so that drops impinging on the face may travel over it to the slot for removal from the system. A reduced pressure is maintained in the catcher to draw the recording material through the slot and the size of the slot and the pressure differential across it are adjusted so that a meniscus is formed at the mouth of the slot. The surface tension of the recording material then acts in opposition to the reduced pressure tending to draw the material into the catcher and maintains the slot full of recording material. This meniscus, in effect, forms a "seal" which prevents air from being drawn into the catcher and eliminates air currents in the vicinity of the catcher which might affect the trajectory of drops intended for deposit on the receiving member.

9 Claims, 4 Drawing Figures

CATCHING APPARATUS AND METHOD FOR JET DROP RECORDING

CROSS REFERENCE TO RELATED APPLICATION

This application is a continuation in part of Ser. No. 277,999 filed Aug. 4, 1972, now abandoned.

BACKGROUND OF THE INVENTION

This invention relates to jet drop recording systems, and more particularly to multiple jet recording systems of the type shown for instance in Sweet et al. U.S. Pat. No. 3,373,437, or in Taylor et al. U.S. Pat. No. 3,560,641. In recorders of the type shown in Sweet et al the jets may be arranged in a single row, while in the Taylor et al. patent they are arranged in a plurality of rows. Such jets may also be arranged in a twin row configuration as shown for instance in Mathis U.S. Pat. No. 3,701,998.

In jet drop recording systems of the above mentioned types all of the jets are stimulated at a uniform frequency to create streams of uniformly sized and regularly spaced drops. All drops are generated in proximity to a suitable charging electrode, and selected ones of the drops are impressed with an electrical charge. All of the drops are caused to pass through an electrical deflection field, and those which are charged are deflected and caught by a suitably positioned catcher. Those drops which are not caught proceed down to a drop receiving member for recording an image thereon.

One of the more difficult operating problems encountered by such recording systems has been unsatisfactory operation of the catchers. In general the drops have been caught on a blade, as shown in Rourke U.S. Pat. No. 3,611,422 or on a smooth, flat catching face as shown in the Mathis patent, and then have been sucked into a collection chamber under the urging of a vacuum. Alternatively the drops have been caught on a porous metal catching face as shown in the Sweet et al patent and have been drawn through the porous metal, again under the action of a vacuum.

Catchers of the Sweet type have not been entirely satisfactory due to the tendency of the drops to splatter upon impact thereagainst, and catchers of the Rourke type have been somewhat unsatisfactory because of the tendency of recording liquid to build up on the edge of the blade and drip from the under side thereof. Accordingly the smooth face catcher as shown in Mathis has been the most satisfactory of available catchers, but it too has a problem in that the air currents caused by the continuous sucking action of the vacuum chamber against the recording fluid entrance slot have tended to disturb the trajectories of the uncharged drops. This in turn has degraded the accuracy of the recording system.

SUMMARY OF THE INVENTION

The present invention provides a catching apparatus and method for a jet drop recording system which, through adjustment of the size of the opening to the catcher and the pressure differential across the opening, prevents injestion of air into the catcher and resulting air currents.

It has been discovered that if the size of the slot or opening into the catcher is dimensioned so as to maintain a meniscus at the mouth of the slot, the meniscus will, in effect, act as a seal and prevent injestion of air into the catcher. Ink which runs down the face of the catcher is drawn into the slot, however, and may be carried away by application of a small vacuum. For any given slot dimension and recording liquid surface tnesion, there is a maximum vacuum which may be tolerated. Application of a vacuum greater than this amount will rupture the meniscus and draw air into the catcher.

As long as the meniscus remains intact, the slot is maintained full of recording liquid and injestion of air is avoided. Consequently drops of recording liquid which fall past the mouth of the slot are not disturbed by transverse air currents and greater precision in drop placement is obtained.

DESCRIPTION OF THE PREFERRED EMBODIMENT

Figure 1:
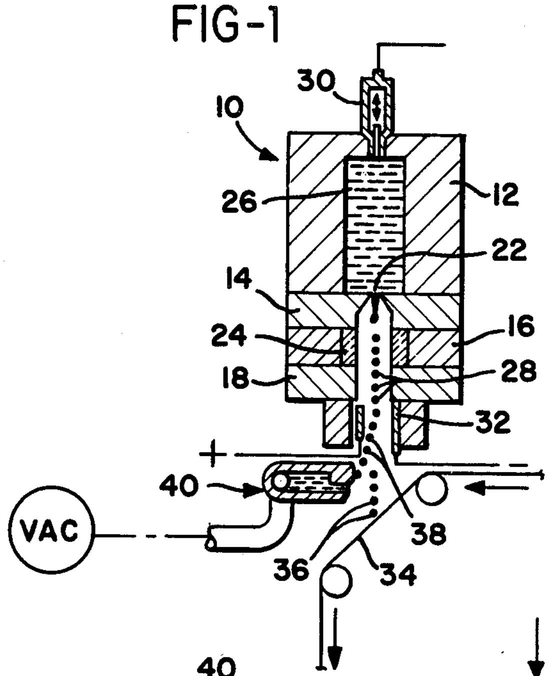
FIG. 1 is a cross sectional view illustrating a jet drop recording system in accordance with the present invention.

Referring initially to FIG. 1 of the drawings, it will be seen that a system in accordance with the present invention comprises a drop generating unit 10 including a manifold 12, an orifice plate 14, a charge ring plate 16, and a spacer plate 18. Orifice plate 14 is provided with a series of small diameter orifices 22 therethrough, while charge ring plate 16 is provided with a series of spaced charge rings 24.

Recording liquid, as at 26, is supplied to the interior of the manifold 12 under pressure and is emitted through the orifices 22 in filaments which break down into a series of fine drops 28. A transducer 30 is preferably provided to impart a stimulating vibration of a predetermined frequency to the unit to insure that the drops 28 are emitted at regularly spaced intervals.

Downstream of the charge ring plate 16 an electrostatic deflecting field is set up by the electrodes 32. A receiving member 34 is conveyed in any convenient manner beneath the unit 10 and receives uncharged drops 36 thereupon, while charged drops 38 are deflected towards the catcher of the present invention, referenced in its entirety by the numeral 40. With the exception of catcher 40 all of the above construction may be as described in the above noted U.S. Pat. No. 3,611,422.

Figure 2:
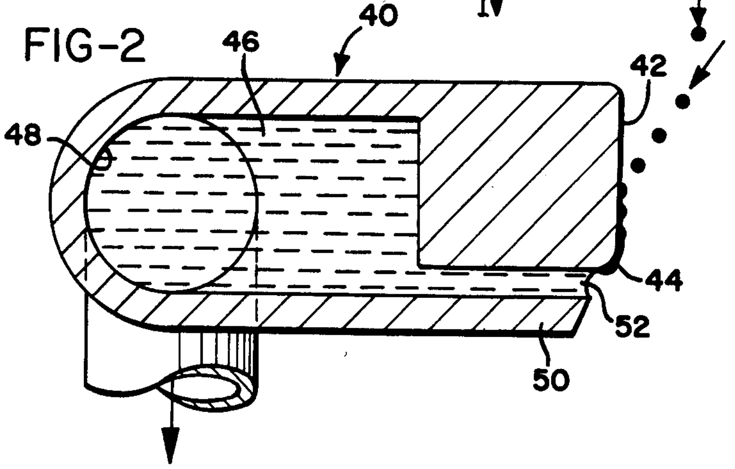
FIG. 2 is an enlarged cross sectional view through the drop catcher.

Catcher 40, as best seen in FIG. 2 of the drawings, is provided with an upper, drop catching face 42 terminating in a curved lower edge 44. The interior of the catcher is relieved to provide a receiving chamber 46 having an outlet 48 therefrom leading to a source of negative pressure, as indicated somewhat schematically in FIG. 1 of the drawings.

A lower plate member 50 is positioned in closely spaced relationship to the curved lower edge 44 of the drop impinging force and defined therewith an elongated slot 52 extending contiguously with the drop catching face 42. Drop catching face 42 is formed of a smooth substantially impervious material having a relatively low degree of wettability so that drops that impinge thereon will readily run down the face to the slot 52.

Figure 3:
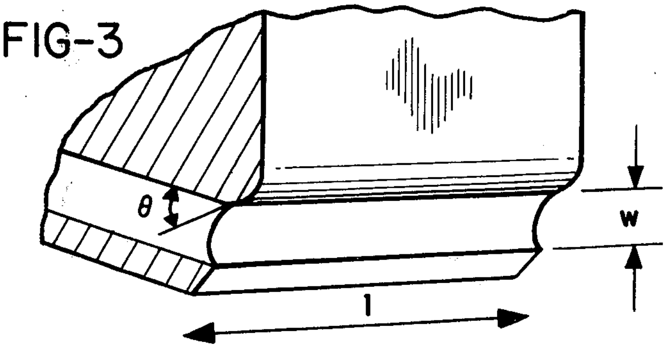
FIG. 3 is an enlarged view of a portion of the drop catcher.
Figure 4:
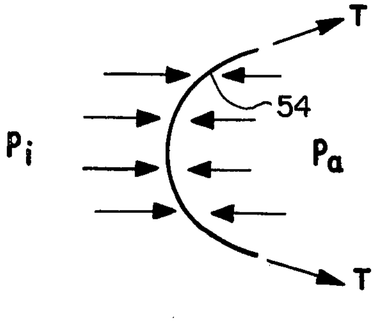
FIG. 4 is a graphic representation of the forces acting on the recording liquid at the mouth of the catcher opening.

With reference now to FIGS. 3 and 4 of the drawings, consideration will be given to the forces acting on the meniscus of recording liquid at the mouth of the slot 52. As indicated in FIG. 4 of the drawings, the forces acting on the meniscus 54 are the internal pressure $P_i$, the ambient pressure $P_a$, usually atmospheric, and the surface tension T. If the forces are in equilibrium they may be summed as follows:

$$w l P_i + 2 l T \cos\theta = w l P_a$$

or $$P_a - P_i = \frac{2T\cos\theta}{w}$$

It will be seen, therefore, that as $P_i$ decreases $\theta$ will decrease until finally, as $\theta$ reaches 0, the meniscus will break and free flow into the chamber 46 will commence. The limiting condition for free flow, therefore, is when $\theta = 0$ and, therefore, $\cos\theta = 1$ or $$P_a - P_i = \frac{2T}{w}$$

Thus, it will be seen that by maintaining the pressure differential, $P_a - P_i$, below a value of $$\frac{2T}{w},$$

an air sealing meniscus may be maintained across the entrance to slot 52. For ink with a surface tension of about 55 dynes per cm., the maximum pressure differential which can be supported by the meniscus is about $$\frac{0.6}{w}$$

psi (where $w$ is expressed in mils).

It is apparent that there is also a minimum pressure differential for satisfactory catcher operation. This minimum is set by fluid flow requirements; that is, the pressure drop across the throat of the slot must be great enough to overcome frictional losses and carry away all coating fluid which impinges against face 42. For a high speed jet drop printing system the miminum satisfactory pressure differential has been found to be about $$\frac{.25}{w^2}$$

($w$ expressed in mils). By equating the maximum and minimum pressure differentials it is found that a practical lower limit on the width of slot 52 is about 0.4 mils. A practical upper limit on slot width for operation without breaking the meniscus has been found to be about 10 mils. The preferred slot width is about 5 mils and the preferred pressure differential between chamber 46 and the outside of the catcher is about 0.1 psi.

Additionally, in order to obtain free flow of the material across the catching face of the catcher, the catching face is preferably substantially impervious and relatively unwettable. In this regard, the curved configuration of the lower edge of the catching face facilitates travel of the recording liquid into the mouth of the capillary slot.

While the method herein described, and the form of apparatus for carrying this material into effect, constitute preferred embodiments of the invention, it is to be understood that the invention is not limited to this precise method and form of apparatus, and that changes may be made in either without departing from the scope of the invention.

What is claimed is:

1. In a jet drop recording system an improved method of catching selected drops from a parallel row of drop streams comprising the steps of:

1. directing said drops toward a vertically oriented drop catching face provided with a capillary slot extending substantially the full length thereof,
2. establishing a continuous meniscus of recording liquid across the entrance to said slot, and
3. drawing away recording liquid which runs downwardly toward said slot by applying across the mouth of said slot a pressure differential great enough for removal of said liquid but less thana an amount equal to twice the liquid surface tension divided by the slot width.

2. The method of claim 1 wherein said pressure differential is about 0.1 psi.

3. The method of claim 1 wherein said pressure differential is greater than an amount equal to 0.25 divided by the square of the slot width said width being expressed in mils.

4. In a jet drop recording system including means for generating a row of recording fluid streams, all stimulated to produce uniformly sized and regularly spaced drops, means for selective application of electrical charges to said drops, electrical deflection field means for deflecting said drops in accordance with the charges impressed thereon, and a catcher for catching those of said drops which are deflected more than a predetermined amount, the improvement wherein said catcher comprises:

a. a relatively smooth and impervious drop catching face for catching the drops which are deflected more than said predetermined amount, b. a capillary slot bounding the lower edge of said face along substantially the full length thereof and having a continuous meniscus of recording liquid blocking the entrance thereto, c. a recording liquid receiving chamber communicating with said slot to receive recording liquid flowing downwardly from said face to said slot, and d. means for maintaining between said chamber and said drop catching face a pressure differential great enough to carry away recording liquid flowing into said slot but less than an amount equal to twice the liquid surface tension divided by the slot width.

5. The improvement of claim 1 wherein said catching face is characterized by a low wettability.

6. The improvement of claim 1 wherein:

said lower edge of said drop catching face curves into said slot.

7. The improvement of claim 6 wherein said slot is approximately 0.4 to 10.0 mils in width.

8. The improvement of claim 7 wherein said slot is approximately 5 mils in width and said means for maintaining a pressure differential maintains a pressure differential of about 0.1 psi.

9. In a jet drop recording system including means for generating a row of jet streams each of which comprises a series of discrete drops of recording liquid, a catcher for catching selected ones of said drops, means for directing some of said drops toward said catcher, and means for supporting a drop receiving member in a position for catching those of said drops which are not caught by said catcher, the improvement wherein said catcher comprises:

a. a smooth impervious drop catching face having a flat upper portion which is parallel to said row of jet streams and an inwardly curved lower portion, b. a lower plate member positioned in closely spaced relationship to said curved lower portion of said drop catching face and defining therebetween a continuous meniscus maintaining capillary slot having a width between about 0.4 and 10 mils, c. a recording liquid receiving chamber communicating with said slot, and d. means for maintaining a differential pressure between said chamber and said face, said pressure differential being great enough to carry away all recording liquid directed toward said slot but less than an amount equal to twice the liquid surface tension divided by the slot width.

* * * * *